May 21, 1940.  K. MAYBACH  2,201,192

CONTROL FOR AUTOMATIC GEARSHIFT MECHANISM

Filed Aug. 25, 1937  3 Sheets-Sheet 1

Inventor
Karl Maybach.
By Edmund H. Parry jr.
Attorney

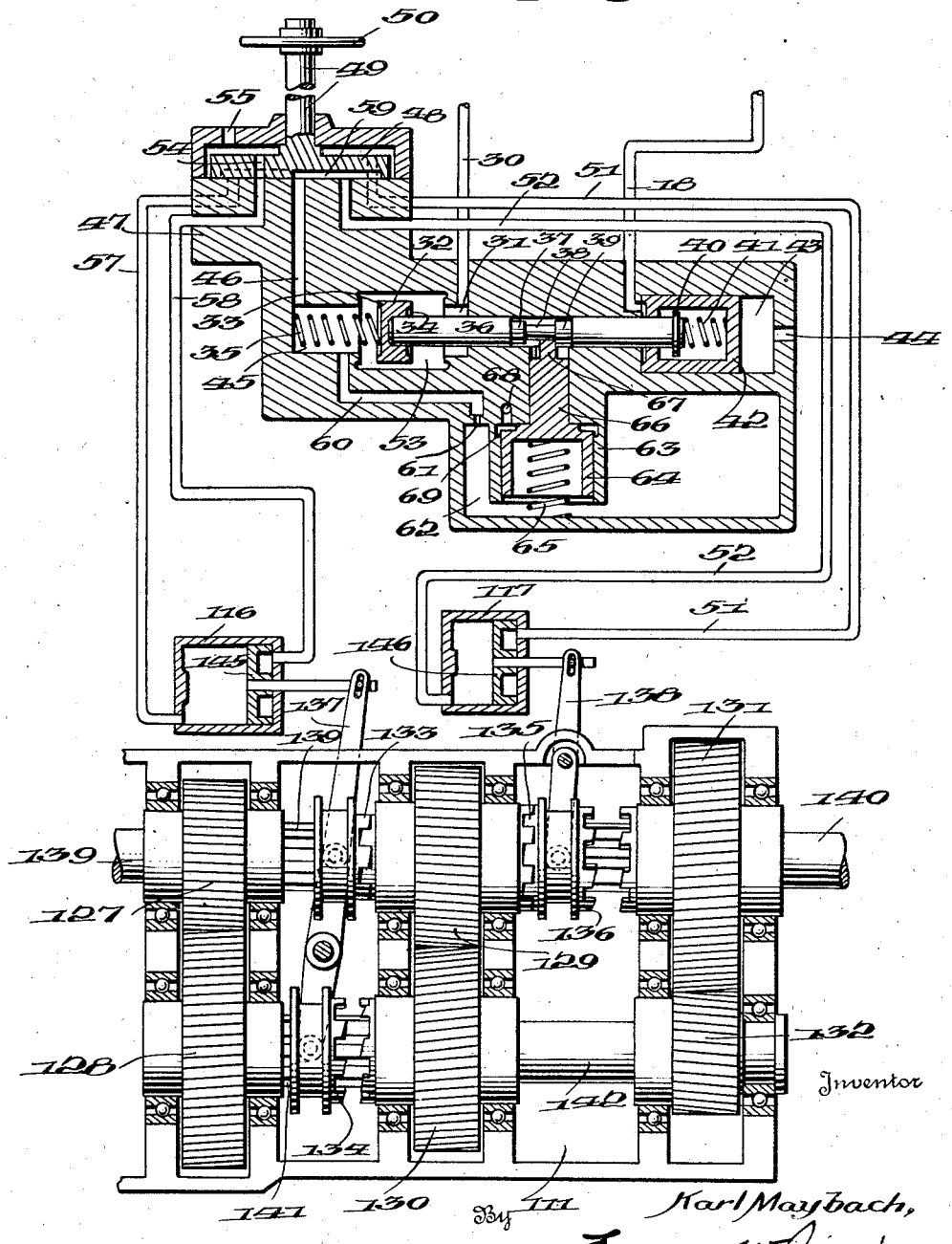

May 21, 1940.  K. MAYBACH  2,201,192
CONTROL FOR AUTOMATIC GEARSHIFT MECHANISM
Filed Aug. 25, 1937   3 Sheets-Sheet 3

Inventor
Karl Maybach,
By Edmund H. Parry
Attorney

Patented May 21, 1940

2,201,192

UNITED STATES PATENT OFFICE 2,201,192

CONTROL FOR AUTOMATIC GEARSHIFT MECHANISM

Karl Maybach, Friedrichshafen, Germany, assignor to Maybach-Motorenbau G. m. b. H., Friedrichshafen, Germany Application August 25, 1937, Serial No. 160,916
In Germany August 28, 1936

14 Claims. (Cl. 192—.01)

This invention relates to pressure-operated automatic gearshift mechanism, such as employed in changing speeds in motor vehicle transmissions, and is directed to improved control means for bringing the shift mechanism into and out of operation.

It has heretofore been proposed to control servo gear shifting mechanism through the gas pedal of the motor vehicle in such manner that when the gas pedal is brought to its idling position pressure medium is supplied to initiate operation of the shift mechanism, and when the gas pedal is depressed from its rest position the pressure medium is cut off and the gearshift mechanism rendered inoperative. Such an arrangement has the disadvantage that starting and stopping of the gear shifting mechanism cannot be effected unless and until the gas pedal is at the idling end of its path of movement.

The present invention employs a control lever, which may be the gas pedal but preferably is the clutch lever, and suitable auxiliary mechanism so arranged that the pressure medium can and will be cut on and off through a very slight movement of the lever forward or backward when the lever is at any position in its path of movement. With such arrangement the shifting of gears can be started more quickly than with prior devices, and it is unnecessary for the lever to be brought to one end of its path of movement.

It is contemplated that the pressure medium will be supplied to the shifting mechanism only momentarily and then be cut off, since sufficient pressure medium can be transmitted thereto very rapidly. As a further feature of the invention it is proposed to provide a further control means, acting cooperatively with the means above mentioned, which functions in the manner of a time control to prevent the cutting off of the supply of pressure medium until a sufficient amount has been developed to cause operation of the shift mechanism. Such control may operate in dependency on the pressure supplied to the shifting mechanism.

Where the lever controlling the supply of pressure medium to the gear shifting mechanism is the clutch lever of the motor vehicle it is desirable to prevent operation of the gear shifting mechanism unless the vehicle motor is at an idling speed. According to the invention control of the gearshift mechanism may be made dependent upon the gas pedal as well as the clutch lever by rendering the clutch lever operative to initiate the gear shifting mechanism only when the gas pedal is in an idling position.

As a further feature of the invention it is proposed to incorporate as a part of the control mechanism a friction clutch device in operative association with the main control lever, whether it be the clutch lever or gas pedal, which will serve the previously stated purpose of enabling the cutting on and off of the pressure medium to the shift mechanism when the lever is in any position of its path of movement, and which will further enable the lever to function for its normal purpose throughout its entire path of movement regardless of the fact that the control mechanism utilizes only a very short movement of the lever.

The above and other features and advantages of the invention will become apparent from the embodiments illustrated in the accompanying drawings now to be described.

In such drawings:

Fig. 2 is a diagrammatic view showing the main control and gear selecting mechanism embodying a further feature of the invention, and operatively connected to an illustrative gear shifting mechanism associated with a gear transmission;

Figure 3:
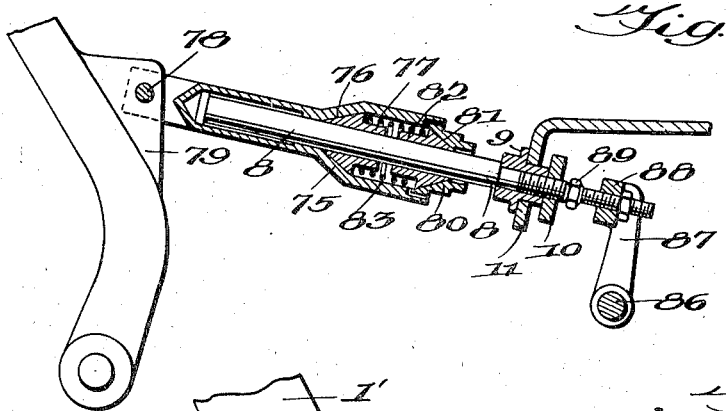
Fig. 3 is an enlarged view, mostly in section, illustrating a modification of the arrangement shown in Fig. 1.
Figure 5:
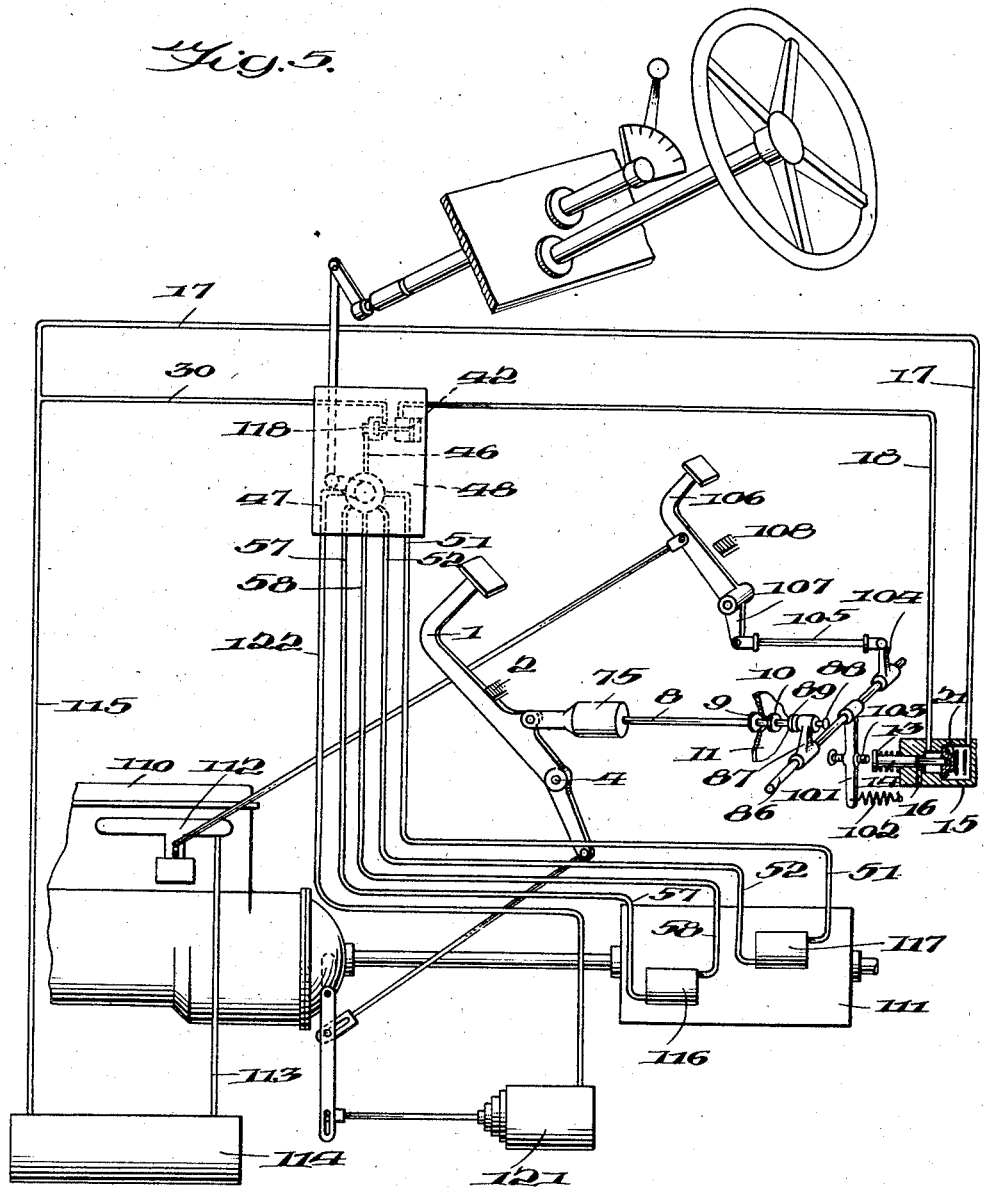

Fig. 5 is a schematic view, partly in perspective, illustrating a complete control system, the gearshift mechanism controlled thereby in connection with a motor vehicle transmission, the control mechanism being operatively connected with the clutch lever through an arrangement such as in Fig. 3 and embodying the further feature that operation of the control mechanism is also dependent on the gas pedal.

Figure 1:
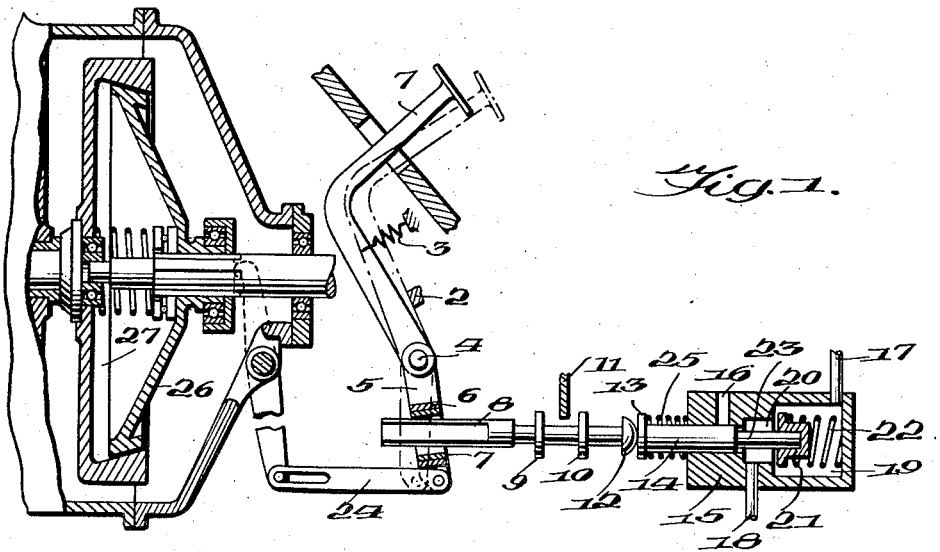
Fig. 1 illustrates the main feature of the control mechanism in an arrangement wherein the clutch lever is employed as the lever controlling the gear shifting operation.

Referring to Fig. 1, the operating lever of the control mechanism is shown at 1. This may be one of the usual pedals of a motor vehicle and preferably, as illustrated constitutes the clutch lever. Such lever is held in the engaged position of the clutch against a stop 2 by a spring 3 and is supported for pivotal movement in a back and forth path on a pivot 4. The movable part 26 of the main clutch 27 of a motor vehicle is actuatable in the normal manner by lever 1 through linkage 24. Arm 5 of lever 1 is provided with a journal bushing 6 in which is inserted a second bushing 7, preferably of a material with a high coefficient of friction. Extending through bushing 7 is an actuating rod 8 through which operation of the gearshift mechanism (as illustrated in Fig. 2) is controlled by lever 1.

Rod 8 is in frictional clutching engagement with bushing 7 but is provided with two spaced stop discs 9 and 10 which coact with an intermediate fixed stop element 11 which limits the back and forth movement of rod 8. Bushings 6 and 7 may be split and pressed together with a clamping means so that sufficient friction is exerted on rod 8 to move the same between its stops. When lever 1 has moved rod 8 so that its stop 9 engages stop 11, rod 8 will slip in bushing 7 during further depression of lever 1. As soon, however, as lever 1 from any position is moved in the opposite direction rod 8 will be moved to the left until its stop 10 engages stop 11, and thereafter bushing 7 will slide on rod 8 until lever 1 has reached its fully released position against stop 2.

With the operative arrangement of lever 1 and rod 8 as just described it will be understood that various types of shift mechanisms for producing different speed selections in a gear transmission may be rendered operative upon movement of lever 1 in one direction and rendered inoperative on movement of lever 1 in the opposite direction from any position of lever 1 in its path of movement. Ordinarily pressure operated gear shifting mechanism is employed. The supply of pressure medium to such mechanism will be controlled either electrically or pneumatically by rod 8. In the arrangement of Fig. 1 rod 8 actuates a valve controlling the flow of pressure medium which serves to effect operation of the gear shifting mechanism.

At the right end of rod 8 is a head 12 engageable with head 13 on rod 14, the latter being slidably mounted in the bore of a valve housing 15. The right hand portion 23 of rod 14 is of reduced diameter. In the larger chamber 19 of the housing is a valve 21 carried by the end of the reduced portion 23 of rod 14. To the left of chamber 19 is a smaller chamber 20, the latter when rod 14 is moved to the left being put into communication with the atmosphere through port 16. A pressure medium intake line 17 opens into chamber 19 and an outlet line 18 communicates with chamber 20. Spring 22 tends to hold valve 21 against its seat so as to prevent flow of the pressure medium from lines 17 to 18. At that time line 18 is vented to the atmosphere through port 16 which is uncovered when rod 14 is in its left position. Spring 25 tends to hold rod 14 against the head of rod 8. When lever 1 is depressed rod 8 is thrown to the right until its stop 9 engages stop 11, and through such movement port 16 is closed and valve 21 opened to permit the flow of pressure medium from line 17 through chambers 19 and 20 to line 18.

Line 17 will be connected to a source of pressure medium. Line 18 is the supply line for governing operation of the pressure operated gearshift mechanism. In the embodiment of Fig. 2, the pressure supplied through line 18 does not itself actuate the gearshift mechanism. A separate pressure supply line is there provided for the gear shifting mechanism having therein a control mechanism which is actuated by the pressure in line 18. In such case the pressure in supply line 18 operates indirectly to effect operation of the shift mechanism by controlling the pressure in the second pressure supply line.

In Fig. 2 is illustrated a gear selecting and control mechanism wherein the supply of pressure to the shift mechanism is regulated through the arrangement of Fig. 1 just described. Line 30 is a connecting line to a vacuum supply and opens into an annular space 31 at the right end of a chamber housing a double acting valve 32 having opposing seats 33 and 34. Valve 32 is supported on the left end of pusher rod 36 which has a central portion 38 of reduced diameter bounded by portions 37 and 39 of intermediate diameter. The right end of rod 36 is provided with a head 40 and is slidable in a piston 42. Spring 41 tends to hold head 40 of rod 36 against the left end of the piston. Piston 42 is slidable in a chamber 43 which at its right end is open to the atmosphere through port 44. Piston 42 is the actuator for moving rod 36 in dependency on the supply of pressure medium controlled by the arrangement of Fig. 1. The outlet line 18 in the arrangement of Fig. 1 communicates as shown in Fig. 2 with the left end of chamber 43 so that when vacuum pressure is admitted through the line piston 42, rod 36 and valve 32 are moved to the left against the action of spring 35 which engages the left end of valve 32.

Vacuum pressure entering through line 30 passes through space 31, valve chamber 53, space 45, and thence through passage 46 to a valve mechanism which may be selectively set to distribute the pressure to the gear shifting mechanism in accordance with the particular speed selection desired. Such valve mechanism comprises a housing 47 in which is mounted a selector disc 48 rotatable through a shaft 49 as by means of a manually operated member 50. Two pairs of lines 51, 52 and 57, 58 connect respectively with gear shifting servo motors 116 and 117 having operating pistons 145 and 146.

The pressure distributing mechanism, which does not form an essential part of the present invention, is provided with a series of ports 54 communicating with the atmosphere through port 55 and a series of grooves 59 communicating with the pressure passage 46. Through rotation of the distributor disc 48 pressure from passage 46 through grooves 59 is supplied to one line of each of pairs 51, 52 and 57, 58 while the other line in each pair is vented to the atmosphere through ports 54 and vent 55. Where a vacuum supply is used as the pressure medium piston 145 of motor 116 and piston 146 of motor 117 will be moved to the right when lines 58 and 51 communicate through the distributor mechanism with passage 46 while lines 57 and 52 are vented. The pistons will be moved to the left when the conditions in the pairs of lines are reversed through readjustment of the pressure distributing disc 48.

Referring again to the control mechanism, an angular passage 60 having a throttling orifice 61 connects valve chamber 53 with a second larger chamber 62. Supported in a suitable guide 63 in chamber 62 is a piston 64 connecting with a rod 66. The upper end of such rod is provided with a latch 67 which through the pressure of spring 65 acting against the lower end of piston 64 engages actuating rod 36 of valve 32. The function of such latch is to regulate the extent of movement of rod 36. In the extreme ends of movement of rod 36 latch 67 will engage one or the other shoulders 37 or 39. When the rod moves from such position the latch under pressure of spring 65 will drop into the groove provided by the central reduced portion 38 of the rod to prevent the rod from moving to its other end position until sufficient vacuum has been transmitted from line 30 through chamber 53 and passage 60 into chamber 62 to cause piston 64 to be drawn downwardly to release the latch from the central groove.

As previously indicated the operation of the control mechanism of Fig. 2 is dependent upon the control mechanism in Fig. 1. The distributor valve 48 is first set so that when the pressure medium is supplied the servomotors 116 and 117 will produce a desired gear selection in a gear transmission of which one type is illustrated. When clutch lever 1 is depressed rod 8 is moved to the right and operates through rod 14 to open valve 21. Vacuum pressure then flows from line 17 through line 18 to draw piston 42 in Fig. 2 to the left against the resistance of springs 41 and 35, and rod 36 moves to the left until latch 67 engages the groove at the central portion 38 of rod 36. When the rod moves to such position valve 32 which has previously been held against its right seat by spring 35 moves to the left to an intermediate position so that vacuum pressure from line 30 flows through valve chamber 53, through passage 46 to the distributor valve 48 and thence through the selected lines to the gear shifting motors 116 and 117. At the same time pressure is supplied through line 46 it is also supplied through passage 60 to chamber 62. By reason of the provision of the throttle opening 61 piston 64 will not be drawn downwardly until sufficient pressure has been supplied through passage 46 to effect operation of the gear shifting motors. It will be observed that piston 64 is responsive to the same pressure as supplied to the motors, and this will insure maintenance of valve 32 in open position for an appropriate time. After the vacuum pressure in chamber 62 has increased sufficiently, piston 64 will move downwardly to release latch 67, and valve 32 will move into engagement with its left seat to cut off communication between passage 46 and the vacuum supply line 30. Because of leakage past piston 64 to annular space 69 and the communicating port 68 opening to the atmosphere, the vacuum in chamber 62 will leak off in a short time so that latch 67 will bear against portion 69 of rod 36 and be in condition to again drop into the central groove when rod 36 is moved to the right.

When the driver moves lever 1 backward towards released position, initial movement of the lever will immediately move rod 8 to the right and cause valve 21 to close. Supply line 17 is then cut off and line 18 is vented to the atmosphere through port 16, all as shown in Fig. 1. The venting of line 18 releases the vacuum acting on piston 42 in Fig. 2, and piston 42 and rod 36 move to the right under action of spring 35. When latch 67 drops into the central groove of rod 36 valve 32 is stopped in an intermediate position in chamber 53 so that vacuum pressure from line 30 again passes through passage 46 and the distributor mechanism to the servomotors 116 and 117. If before lever 1 has been released the distributor valve 48 has been set to a new position the motors will serve to produce a new gear selection in the transmission. If, however, there has been no such adjustment the gear shifting motors will remain idle. It will thus be understood that rod 36 and valve 32 are operative to produce a new gear selection when moving from right to left or left to right.

When valve 32 is in its intermediate position as just described during movement from left to right vacuum is again supplied through passage 60 to chamber 62, and after a short time position 64 will be drawn downwardly to release latch 67. Thereupon valve 32 will move from its intermediate position into engagement with its right end seat, thus cutting off communication between the vacuum supply line 30 and passages 46 and 60.

The transmission illustrated in Fig. 2 for the purpose of indicating the operation of the gear shifting motors 116 and 117 is of a form adapted to produce four forward speeds. Such transmission comprises three sets of coacting gears 127 and 128, 129 and 130 and, 131 and 132. The drive shaft from the motor to which gear 127 is fixed has a splined portion 139 on which is slidable a claw clutch 133. The countershaft carrying gear 128 has a similar splined portion 141 on which is slidable a claw clutch 134. Through lever 137 actuatable by piston 145 of shaft motor 116 clutches 133 and 134 are alternately operated to engage with clutch halves on the respective gears 129 and 130. Gear 129 has at its right end a second clutch half engageable with the left portion 135 of a double claw clutch splined to the driven shaft 140. The right hand portion 136 of such clutch is adapted to engage a clutch half on gear 131. The double claw clutch is actuatable through lever 138 by piston 146 of the second gear shifting motor 117.

For first speed pistons 145 and 146 are moved to their left positions through the control mechanism, and the drive from shaft 139 to shaft 140 will be through gears 127 and 128, clutch 134, shaft 142, gears 132 and 131, and clutch 136. In second speed pistons 145 and 146 will respectively be in their right and left positions, and the drive will be through clutch 133, gears 129 and 130, shaft 142, gears 132 and 131, and clutch 136. In third speed pistons 145 and 146 will respectively be in their left and right positions, and the drive will be through gears 127 and 128, clutch 134, gears 130 and 129, and clutch 135. In fourth speed pistons 145 and 146 will both be in their right positions, and a direct drive between shafts 139 and 140 will be effected through clutches 133 and 135.

In Fig. 2 the transmission is set for fourth speed. However, with the particular set of the distributor disc 48 lines 58 and 51 are vented to the atmosphere through port 55 and vacuum pressure is being supplied from passage 46 through lines 58 and 52. The pistons are therefore about to move to their left end positions which would be effective to change the transmission to first speed.

In lieu of the control device shown in Fig. 1 another form of friction clutch, shown in Fig. 3, may be employed. The operating lever 1 again actuates a valve operating rod 8 provided with spaced stop discs 9 and 10 coactive with a fixed stop 11. Rod 8 is movable in a housing 75 provided with a conical surface 76 against which seats the conical outer surface of a slotted packing, or bushing, 77. The housing is pivotally connected at 78 to a lug 79 on the operating lever. A screw cap 80 is arranged at the opposite end of the housing provided with a conical surface 81 against which seats a second packing, or bushing 82. A spring 83 is arranged between the two members 77 and 82 by means of which such elements are compressed against the conical surfaces 76 and 81 and caused to frictionally grip rod 8 which extends therethrough. Pivotally mounted on shaft 86 is an arm 87 actuatable by rod 8. Through suitable connections movement of arm 87, or its shaft 86 may be used to operate a valve mechanism such as shown in Fig. 1. Arm 87 is provided with an adjustment screw 88 having a head 89 engageable by the end of rod 8. When the operating lever 1 is swung to the left from any position in its path of movement the frictional elements 77 and 82 will grip rod 8, moving the same to the left until stop 10 engages stop 11 so that arm 87 is actuated. Rod 8 will thereafter slip in elements 77 and 82 so that lever 1 may be moved further in its path of movement to the left. As soon, however, as lever 1 is caused to move back in the opposite direction rod 8 will immediately move to the right.

With the arrangement as just described diminution of the friction through wear is avoided since spring 83 and the conical surfaces 76 and 81 provide an automatic wear takeup on the wear surfaces of the packings 77 and 82. Packings 77 and 82 are always maintained under compression in proper frictional engagement with rod 8.

Figure 4:
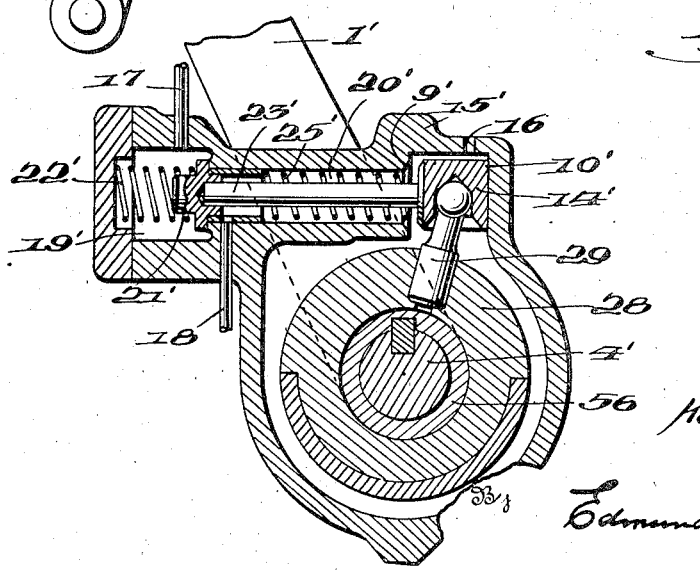
Fig. 4 is an enlarged view illustrating a further modified construction.

A still further embodiment of the frictional clutch mechanism between the operating lever and the control mechanism is shown in Fig. 4. The operating lever 1' is fixed to a shaft 4' which is rotated thereby. Surrounding shaft 4' is a friction washer 28 which frictionally engages the interposed bushing 56 keyed on shaft 4'. Fitted in a washer is a driving pin 29 which at its upper end is connected through a ball and socket joint to the larger portion of the valve actuating rod 14', movable in the upper portion of the casing 15'. The main portion 23' of the rod is of smaller diameter and extends through a chamber 20'. At the left end of portion 23' is a valve 21' movable in a chamber 19' which is held in engagement with its seat by springs 22' and 25'. The vacuum supply line 17 opens into chamber 19' and when valve 21 is opened communicates with the outlet line 18. When the valve is closed so that rod 14' is in its right end position line 18 is vented to the atmosphere through port 16. The casing 15' is so formed as to provide stops 9' and 10' to limit the right and left movement of the rod. When rod 14' is in its left position with valve 21 open the shoulder constituting the stop 9' provides a valve seat for the corresponding end of the enlarged portion of the rod so that communication of line 18 and chamber 20' are cut off from the venting port 16. With the arrangement as described movement of the operating lever 1' to the left rotates shaft 4' and its bushing 56. Through frictional engagement washer 28 and pin 29 are moved to the left to actuate rod 14' and open valve 21'. When the enlarged portion of the rod engages stop 9' washer 28 will slip on bushing 56 during further movement of lever 1'. Immediately, however, on movement of lever 1' to the right washer 28 will be rotated with bushing 56 until stop 10' is reached. During further movement of lever 1 to the right slippage will occur between the washer and bushing.

In Fig. 5 the various parts heretofore described are shown diagrammatically and similar reference numerals are applied. Movement of clutch pedal 1 through a frictional clutch 75 of the type shown in Fig. 3 transmits through rod 8 movement to arm 87 fixed on shaft 86 until stop 9 on rod 8 engages the fixed stop 11. Fixed to rod 86 is a second arm 101 carrying an adjustable screw 103 which is tensioned against head 13 of actuating rod 14 of a pressure control valve such as shown in Fig. 1. Adjustment screw 88 is carried by arm 87 and provided with a head 89 engageable with the end of rod 8.

A further arm 104 is fixed to shaft 86 which connects through rod 105 with the lower portion of the gas pedal 106 of the vehicle motor 110. In its released idling position pedal 106 engages stop 108. Spring 102 on arm 101 is made sufficiently strong that under conditions to be described it will pull arm 101 to the right to actuate rod 14 and open valve 21. The arrangement of the parts is such that when the gas pedal 106 is released the head of screw 88 on arm 87 will bear against the right end of rod 8. The adjustment of screws 88 and 103, however, is such that arm 101 under tension of its spring 102 cannot move to the right to open the valve until clutch lever 1 is depressed to move rod 8 to the left. The valve will, however, be opened when stop 10 on rod 8 is brought into engagement with stop 11. Further movement of the clutch lever can be had independent of rod 8 by reason of the arrangement of the frictional clutch 75. As soon as the clutch lever starts to move in the opposite direction rod 8 will be thrown to the right during the early portion of the movement. Arm 87 through shaft 86 will swing arm 101 to the left to close the valve.

In the event gas pedal 106 is in depressed position when clutch lever 1 is operated it will be seen that arm 101 will be swung to the left away from the valve so that rod 8 and spring 102 will be ineffective to open valve 21. While in the embodiments of the invention heretofore described the control valve was dependent upon the operation of only a single lever, Fig. 5 provides an arrangement under which the operation of the gear shifting mechanism is controlled by the clutch lever, so that the gears are shifted when the clutch is depressed, but according to which shifting will not take place unless the gas pedal is in idling position.

The vacuum supply for both the control mechanism and the gear shifting mechanism in the arrangement of Fig. 5 comprises a chamber 114 connecting with the intake manifold 112 of the motor 110 through line 113. From chamber 114 extends a supply line 115 having two branches 17 and 30. Vacuum pressure from line 17 is supplied to line 18 under control of valve 21 actuatable through the clutch pedal 1 in dependency on gas pedal 106 in the manner just described. Vacuum pressure from line 18 actuates piston 42 which opens valve 118 of the main control mechanism and permits pressure from the second branch 30 of the supply line 115 to flow into passage 46, all as will be understood from the previous description of Fig. 2. Through manipulation by the driver of the pressure distributor valve 48 in the control housing 47, pressure is selectively supplied to one line of each of the pairs 51, 52 and 57, 58, of the gear shifting motors 117 and 116 for the gear transmission 111.

The arrangement as shown in Fig. 5 also provides for power operation of the main clutch by a servomotor 121 which is operated by vacuum pressure supplied through line 30 and passage 146 under control of valve 118. The automatic operation of the clutch is not an essential feature of the system as previously described, and if employed other types of mechanism may be substituted.

In control devices for gear shifting mechanism in automobile transmissions which are operated solely through the gas pedal, it is usually necessary to provide an arrangement such that free wheeling occurs every time the gas pedal is released to idling position or else that the main clutch is declutched. In many cases this is not desirable. With the control arrangement as shown in Fig. 5 it is not necessary that free wheeling shall always occur in the idling position of the gas pedal. Nevertheless, the arrangement for the dual control of the gear shifting mechanism by both the clutch lever and gas pedal has the advantage that the driver is forced to completely release the gas pedal in order to initiate a gear shifting operation. By such means not only is racing of the motor prevented during the shifting operation, but when vacuum is employed as the pressure medium there is the additional advantage that a high vacuum is always available for operation of the shifting mechanism because of the high vacuum condition in the intake manifold of the vehicle motor when the gas throttle is closed.

As previously stated, the control mechanism of the invention is not limited to the various detailed arrangements herein show and described. The showing of the speed selecting mechanism operatively associated with the control mechanism of the invention, also the particular form of gear shifting servomotors and the design of the particular transmission illustrated are entirely arbitrary as regards the essential features of the invention.

I claim:

1. In combination, in a motor vehicle, power operated gear shifting mechanism a lever movable forward and backward in a path, and being capable of movement in said path independently of the gear shifting mechanism, control means for the power operated gear shifting mechanism actuatable by said lever during movement thereof over less than its full path, and actuating means between the lever and control means responsive to initial movement of the lever in its path in a forward direction to actuate the control means to initiate operation of the gear shifting mechanism and responsive to initial movement of the lever from any point in its path in the return direction to reversely actuate the control means to render the gear shifting mechanism inoperative.

2. In or for a motor vehicle having a clutch, a lever for engaging and disengaging the clutch, a variable speed gearing and power operated shift mechanism for the gearing, control means for the gearshift mechanism adapted to be operated by the clutch lever and having actuating means responsive to initial movement of the clutch lever from any position during both clutch engaging and clutch disengaging movements of said lever.

3. A control device for power-operated gearshift mechanism including a lever member movable forward and backward in a path, a control member for controlling operation of the gearshift mechanism operable by said lever, and friction clutch means between said members comprising a rod movable with one of said members, a housing having conical ends movable with the other of said members and into which said rod extends, and a pair of spring-pressed packings surrounding said rod, said packings having conical outer surfaces and being fitted in said housing.

4. A control device for power-operated gear shifting mechanism in a motor vehicle adapted to operate in dependency on the vehicle clutch, including a vehicle clutch operating lever movable forward and backward in a path, a control member for controlling operation of the gear shifting mechanism operable by said clutch operating lever, a frictional connection between the cluch operating lever and control member permitting movement of the clutch lever in its path in both directions independent of the control member but being operative to produce actuation of the control member upon initial movement of the clutch lever in both directions in its path.

5. A control device for power-operated gear shifting mechanism including a lever movable forward and backward in a path, a control member for controlling operation of the gear shifting mechanism operable by said lever, a frictional connection between the lever and control member permitting movement of the lever in its path in both directions independent of the control member but being operative to produce actuation of the control member upon initial movement of the lever in both directions in its path, and stop means comprising spaced elements attached to the control member and a fixed intermediate coacting element for limiting movement of the control member in both directions.

6. A control device for pressure-operated gear shifting mechanism including a pressure control valve, a lever movable forward and backward in a path, said lever being capable of movement in its path independently of the gear shifting mechanism adapted to operate said valve during movement over less than its full path, and actuating means responsive to initial movement of the lever in its path in one direction to open said valve to initiate operation of the gear shifting mechanism and responsive to initial movement of the lever from any position in its path in the return direction to close said valve to render the gear shifting mechanism inoperative.

7. In or for a motor vehicle having a clutch, a clutch operating lever, and pressure operated gear shifting mechanism, a pressure control valve for controlling operation of the gear shifting mechanism, a rod for actuating said valve, and a frictional connection between said rod and said lever.

8. A control device for pressure-operated gear shifting mechanism including a lever movable forward and backward in a path, a pressure control valve for controlling operation of the gear shifting mechanism, a rod for actuating said valve, a frictional connection between said rod and said lever, and stop means comprising spaced elements attached to the rod and a fixed intermediate coacting element for limiting movement of the rod.

9. A control for pressure-operated gear shifting mechanism including a control valve for controlling the supply of pressure to the gear shifting mechanism, a pressure-responsive actuator for said valve, a second control valve controlling the supply of pressure to said actuator of the first valve, a lever movable forward and backward in a path for operating the second control valve, and connecting means for effecting actuation of said second valve upon the initiation of movement of the lever in either direction of its path.

10. A control device for pressure-operated gear shifting mechanism including a control valve for controlling the supply of pressure to the gear shifting mechanism, a pressure-responsive actuator for said valve, a lever movable in a path, actuating means for opening and closing said valve operated by said lever, a frictional connection between the lever and said actuating means adapted to cause operation of the actuating means upon initiation of movement of the lever from any position in its path, and automatic means operating independently of the lever controlling the closing of the pressure supply control valve.

11. A control device for pressure-operated gear shifting mechanism including a control valve for controlling the supply of pressure to the gear shifting mechanism, a pressure-responsive actuator for said valve, a lever movable in a path, actuating means for opening and closing said valve operated by said lever, a frictional connection between the lever and said actuating means adapted to cause operation of the actuating means upon initiation of movement of the lever from any position in its path, and pressure responsive means responsive to the pressure for operating the gear shifting mechanism controlling the closing of the pressure control valve.

12. A motor vehicle having a clutch lever, a motor throttle lever and power-operated gear shifting mechanism, control means for the gear shifting means actuatable by the clutch lever and means responsive to movement of the motor throttle lever interposed between the clutch lever and control means for causing the control means to be actuated by the clutch lever in dependency on the operating position of the motor throttle lever.

13. A control device for power-operated gear shifting mechanism for a motor vehicle provided with a clutch lever and a motor throttle lever, comprising control means for controlling the power supply to the gear shifting mechanism, actuating means for the control means adapted to be operatively connected to the clutch lever, and means interposed between the clutch lever and said actuating means and adapted to be operated by the motor throttle lever for rendering said actuating means responsive and non-responsive to movement of the clutch lever in dependency on the operating position of the motor throttle lever.

14. A control device for power operated gearshift mechanism including a lever member rotatable about an axis, control means for controlling operation of the gearshift mechanism actuated by a rotatable arm member operable by said lever, and frictional connection means between said members comprising a shaft element rotatable with one of said members, an annular element enclosing the shaft element and rotatable thereabout with the other of said members, and a frictional packing bushing between and engaging said elements.

KARL MAYBACH.